(12) United States Patent
Sato

(10) Patent No.: US 11,803,258 B2
(45) Date of Patent: Oct. 31, 2023

(54) ELECTRONIC PEN

(71) Applicant: Wacom Co., Ltd., Saitama (JP)

(72) Inventor: Yuta Sato, Saitama (JP)

(73) Assignee: Wacom Co., Ltd., Saitama (JP)

( * ) Notice: Subject to any disclaimer, the term of this patent is extended or adjusted under 35 U.S.C. 154(b) by 39 days.

(21) Appl. No.: 17/450,270

(22) Filed: Oct. 7, 2021

(65) Prior Publication Data
US 2022/0026996 A1    Jan. 27, 2022

Related U.S. Application Data

(63) Continuation of application No. PCT/JP2020/002667, filed on Jan. 27, 2020.

(30) Foreign Application Priority Data

Apr. 22, 2019  (JP) ................. 2019-080767

(51) Int. Cl.
G06F 3/038     (2013.01)
G06F 3/0354    (2013.01)

(52) U.S. Cl.
CPC ........ *G06F 3/0383* (2013.01); *G06F 3/03545* (2013.01); *G06F 2203/0384* (2013.01)

(58) Field of Classification Search
None
See application file for complete search history.

(56) References Cited

U.S. PATENT DOCUMENTS

2018/0267636 A1    9/2018 Chiu et al.
2020/0033986 A1*   1/2020 Kämpf ................ G06F 3/04883

FOREIGN PATENT DOCUMENTS

WO    2017/110338 A1    6/2017

OTHER PUBLICATIONS

International Search Report dated Apr. 7, 2020, for the corresponding International Patent Application No. PCT/JP2020/002667, 4 pages. (With English Translation).

* cited by examiner

*Primary Examiner* — Ifedayo B Iluyomade
(74) *Attorney, Agent, or Firm* — Seed IP Law Group LLP

(57) ABSTRACT

Disclosed herein is an electronic pen including a cylindrical casing, a first circuit assembly housed in the cylindrical casing, a second circuit assembly housed in the cylindrical casing, and a cable connected to the first circuit assembly and extending from the first circuit assembly toward the second circuit assembly. The cable includes a portion that is bent and folded back toward the first circuit assembly over the second circuit assembly and connected to the second circuit assembly. The portion of the cable that is bent and folded is housed in a housing space between the second circuit assembly and the casing when the first circuit assembly and the second circuit assembly are housed at a fixed position in the cylindrical casing.

6 Claims, 3 Drawing Sheets

ELECTRONIC PEN

BACKGROUND

Technical Field

This disclosure relates to an electronic pen that implements functions as a position indicator for a position detecting device mounted in electronic equipment such as a tablet personal computer (PC), for example.

Background Art

In PCT Patent Publication No. WO2017/110338, an invention relating to an electronic pen of an active capacitive system is disclosed. A circuit board (printed circuit board) is mounted in this electronic pen. On this circuit board, a circuit part including an integrated circuit (IC) and peripheral circuit parts of the IC is disposed. The IC configures a signal generating circuit that generates a signal to be sent out from a core body and a control circuit that controls transmission of the signal from this signal generating circuit to the core body. A push switch (side switch) is included in the peripheral circuit parts in some cases.

Further, to the circuit board, a conductor terminal component that connects, for example, the core body and the signal generating circuit and a conductor terminal component that transmits detection output of the writing pressure from parts for pressure sensing are connected. In addition, a battery that supplies drive power to the circuit part formed on the circuit board is mounted in this electronic pen. As above, various parts such as the battery and the circuit board (electronic pen unit) for implementing electronic pen functions are mounted in the electronic pen of the active capacitive system.

In recent years, further addition of functions to electronic pens has been considered. For example, it is conceivable that an electronic pen is equipped with a short-range wireless communication function of the Bluetooth (registered trademark) standard. This makes it possible to transmit identification information of the electronic pen and so forth to the position detecting device side and receive authentication information and various parameters from the position detecting device side, for example.

In the case of equipping the electronic pen with the short-range wireless communication function, there is a need to satisfy various conditions such as reducing the influence on the existing circuit board that implements electronic pen functions and realizing easiness of assembly and maintenance. For this reason, it is conceivable that, instead of implementing a short-range wireless communication circuit in the existing circuit board, a short-range wireless communication unit is provided separately from the existing circuit board (electronic pen unit) and is mounted in the electronic pen.

In this case, there arises the need to supply drive power to the short-range wireless communication unit and provide necessary information to the short-range wireless communication unit from a control IC or the like of the existing circuit board. Therefore, there arises the need to connect the short-range wireless communication unit and the existing circuit board by a cable. Further, in order to carry out connection work easily and surely, the length of the cable needs to be set to a length having a certain degree of margin. However, when the cable is long, inconvenience occurs when it is housed in the casing of the electronic pen.

The cable that connects the existing circuit board and the short-range wireless communication unit is a wide-width cable including plural signal lines, power supply lines, and so forth. Thus, in the case of attempting to house the cable in the casing of the electronic pen with the cable folded, there is a possibility of the occurrence of such inconveniences that there arises the need to increase the total length of the electronic pen, that damage to the cable itself is caused, and that a force of the cable for extension thereof works to make the cable come off from the connecting part.

BRIEF SUMMARY

In view of the above, for example, the disclosure intends to provide an electronic pen that does not cause a problem even when an existing circuit part and an additional circuit part are connected by a cable.

In order to solve the above-described problem, there is provided an electronic pen including a cylindrical casing, a first circuit assembly housed in the cylindrical casing, a second circuit assembly housed in the cylindrical casing, and a cable connected to the first circuit assembly and extending from the first circuit assembly toward the second circuit assembly. The cable includes a portion that is bent and folded back toward the first circuit assembly over the second circuit assembly and connected to the second circuit assembly. The portion of the cable that is bent and folded is housed in a housing space between the second circuit assembly and the casing when the first circuit assembly and the second circuit assembly are housed at a fixed position in the cylindrical casing.

According to this electronic pen, the first circuit assembly and the second circuit assembly are arranged in series and are housed in the cylindrical casing. In this case, the cable connected to the first circuit assembly is extended toward the second circuit assembly and is bent and folded back toward the first circuit assembly over the second circuit assembly and is connected to the second circuit assembly. Therefore, because the cable extended from the first circuit assembly can be connected to the second circuit assembly, the first circuit assembly and the second circuit assembly can easily be connected by the cable.

When the first circuit assembly and the second circuit assembly are housed at the fixed position in the cylindrical casing, the portion of the cable that is bent and folded is housed in the housing space. As a result, the cable does not become an obstacle to housing of the first circuit assembly and the second circuit assembly in the cylindrical casing. Further, it is possible to prevent the occurrence of an inconvenience that an excessive load (stress) is applied to the cable.

DETAILED DESCRIPTION

Figure 1:
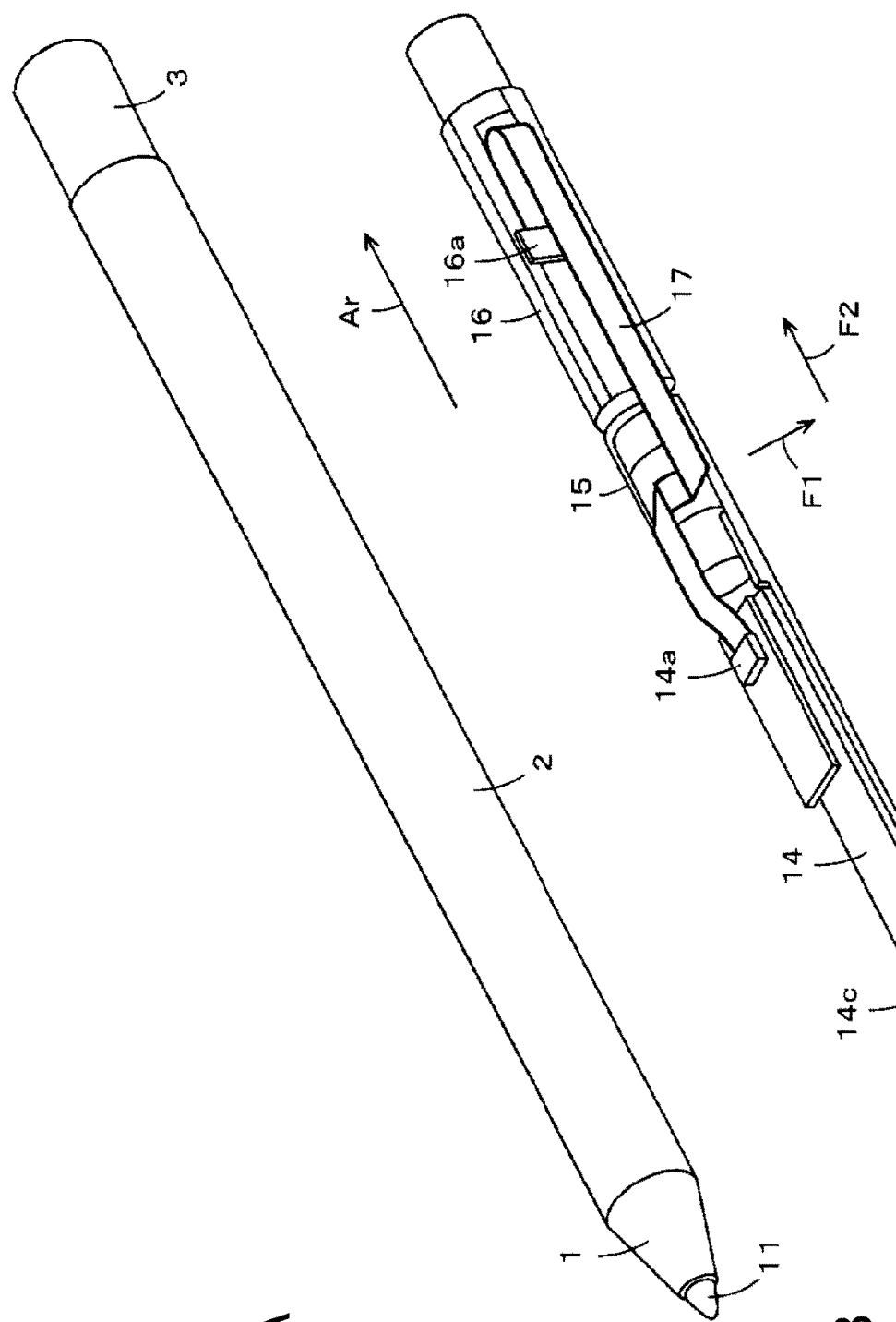
FIG. 1A and FIG. 1B are diagrams for explaining an electronic pen of an embodiment.

FIG. 1A and FIG. 1B are diagrams for explaining an electronic pen of an embodiment. Specifically, FIG. 1A is an appearance diagram of this electronic pen, and FIG. 1B is a diagram for explaining the internal configuration of this electronic pen. As illustrated in FIG. 1A, the electronic pen of the embodiment includes a front cap 1, a cylindrical casing 2, and a rear cap 3 and has appearance in which a core body 11 that forms a pen tip from the inside of the cylindrical casing 2 protrudes from an opening part of the tip of the front cap 1 with a taper shape.

The front cap 1 and the rear cap 3 are both made attachable and detachable to and from the cylindrical casing 2. For example, the front cap 1 and the rear cap 3 can be made attachable and detachable on the basis of on a screw system, by providing screw threads in outer surfaces of portions of the front cap 1 and the rear cap 3 which are joined to the cylindrical casing 2, and in inner surfaces of the cylindrical casing 2 on the front end side and on the rear end side thereof. Further, the front cap 1 and the rear cap 3 can be made attachable and detachable on the basis of a fitting system, by setting the outer diameter of the fitting portions of the front cap 1 and the rear cap 3 slightly larger than the inner diameter of the cylindrical casing 2. Needless to say, the front cap 1 and the rear cap 3 can be configured attachably and detachably to and from the cylindrical casing 2 on the basis of other various systems.

An electronic pen functional part is mounted in the cylindrical casing 2. The electronic pen functional part includes the core body 11, a writing pressure detecting part 12 on which the core body 11 is mounted, a first circuit part 14, a battery 15, and a second circuit part 16. The writing pressure detecting part 12 is disposed on the pen tip side of a placement component 13 and detects the writing pressure applied to the core body 11 mounted on the writing pressure detecting part 12, to notify the first circuit part 14 of information indicating the detected writing pressure. Note that the first circuit part 14 and the battery 15 are placed on the placement component 13. This placement component 13 makes it possible to integrally treat the writing pressure detecting part 12 on which the core body 11 is mounted, the first circuit part 14, and the battery 15.

Various circuit parts such as an IC 14a for control, a transmitting circuit that is not illustrated in the diagram, and a capacitor are mounted in the first circuit part 14. Besides, the first circuit part 14 includes a connector part 14a for enabling electrical connection with the second circuit part to be described later. Further, it is also possible to mount, in the first circuit part 14, parts that configure a side switch for implementing functions similar to ones of a click button of what is called a mouse that is a pointing device, which are not illustrated in the diagram.

The battery 15 supplies drive power to the first circuit part 14 and the second circuit part 16 that configure the electronic pen functional part. In the electronic pen of the embodiment, the battery 15 can be charged in such a manner as to receive power feed from the external through an universal serial bus (USB) connector (not illustrated) mounted in the second circuit part 16 to be described later.

In the embodiment, the second circuit part 16 is a part in which a short-range wireless communication circuit for implementing a short-range wireless communication function of the Bluetooth (registered trademark) standard is mounted. The second circuit part 16 receives the supply of the drive power from the battery 15 via the first circuit part 14. The second circuit part 16 acquires identification information of the self-device stored in a memory of the IC 14c for control and transmits the acquired identification information toward external equipment such as a smartphone to allow authentication processing to be executed between this smartphone and the electronic pen. Note that the USB connector (not illustrated) is mounted in the second circuit part, and the configuration is made in such a manner that reception of supply of power and transmission and reception of information can also be carried out through this USB connector.

Further, it is also possible to transmit a control signal through the short-range wireless communication circuit of the Bluetooth (registered trademark) standard to control external equipment according to instruction input from a user, by disposing a side switch or a push switch at the rear end part in the electronic pen to allow acceptance of the instruction input from the user. For example, this electronic pen can be used as a shutter switch of a smartphone in which a camera function is allowed to operate. In addition, the second circuit part 16 is also capable of accepting information from external equipment and changing the processing mode of the self-device, for example.

As above, in the electronic pen of the embodiment, the core body 11, the writing pressure detecting part 12, and the first circuit part 14 implement functions of an active capacitive pen that sends out a position indication signal including information regarding the detected writing pressure. The second circuit part 16 implements the short-range wireless communication function that enables transmission and reception of information with external equipment. Note that it is also possible to transmit the information regarding the writing pressure detected by the writing pressure detecting part 12, to an external device through the second circuit part 16.

The second circuit part 16 includes a connector part 16a for electrically connecting with the first circuit part 14. The connector part 16a of the second circuit part 16 and the connector part 14a of the first circuit part 14 are connected by a flexible cable 17. The flexible cable has what is called a tape shape (strip shape) and is a wiring line that has flexibility and is capable of large deformation such as folding-back. The flexible cable 17 of the embodiment has plural lines such as supply lines of power and signal lines.

In the electronic pen of the embodiment, as illustrated in FIG. 1B, the connector part 14a is disposed on an upper surface of the first circuit part 14 in such a manner that an insertion port into which the flexible cable 17 is inserted is oriented toward the side of the second circuit part 16. As illustrated in FIG. 1B, the connector part 16a is disposed on a side surface of the second circuit part 16 along the axial center direction (center axis direction) of the electronic pen indicated by an arrow Ar and at a position obtained by rotation by 90 degrees with respect to the surface (upper surface) on which the connector part 14a is disposed in the first circuit part 14. Further, an insertion port of the connector part 16a disposed in the second circuit part 16 is oriented toward the rear end side of the electronic pen, which is in the opposite direction with respect to the direction in which the first circuit part 14 is located.

Thus, as illustrated in FIG. 1B, the flexible cable 17 connected to the connector part 14a of the first circuit part 14 is made to extend toward the connector part 16a of the second circuit part 16 by being folded twice in different directions on the battery 15. Specifically, the other end of the flexible cable 17 is made to head to the connector part 16a by folding the flexible cable 17 downward as indicated by an arrow F1 and subsequently folding the flexible cable 17 toward the side of the second circuit part 16 as indicated by an arrow F2. Note that the folded portions are processed in such a manner as not to return to the original form, by applying a pressure to the folded portions, for example.

Accordingly, even when the connector part 16a of the second circuit part 16 is not provided on the surface on which the connector part 14a of the first circuit part 14 is located or a surface parallel to the surface on which the connector part 14a is located, both connector parts can be connected by the flexible cable 17 reasonably.

Figure 2:
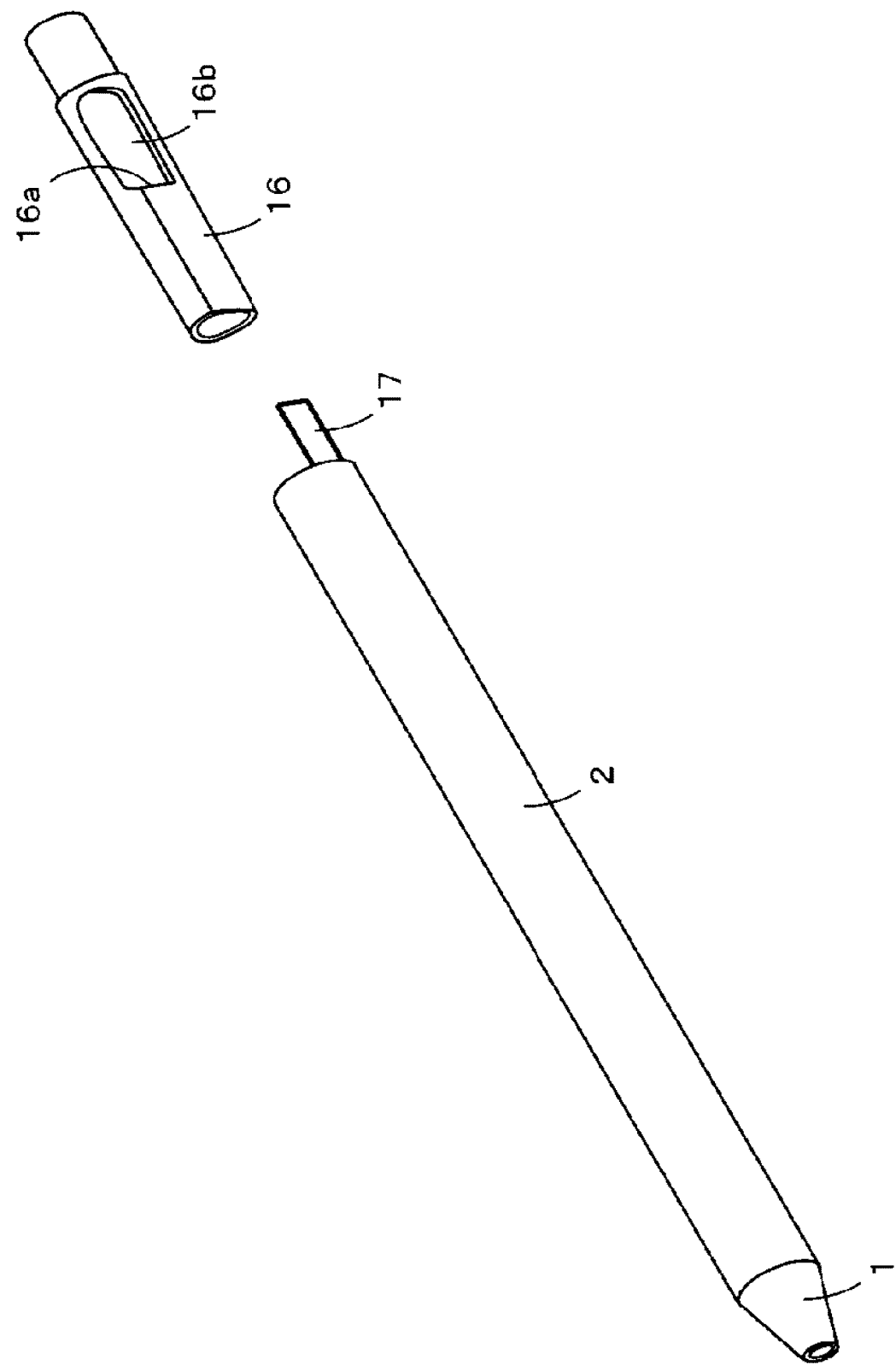
FIG. 2 is a diagram for explaining a state before a second circuit part is connected to a first circuit part housed in a cylindrical casing.

FIG. 2 is a diagram for explaining a state before the second circuit part 16 is connected to the first circuit part 14 housed in the cylindrical casing 2 through the flexible cable 17. In FIG. 2, in the cylindrical casing 2, a portion including the writing pressure detecting part 12, the first circuit part 14, and the battery 15 that are mounted on the placement component 13 as illustrated in FIG. 1B has already been housed. This portion can integrally be treated with the placement component 13 and is housed in the cylindrical casing 2 from the opening part on the front end side from which the front cap 1 is removed or the opening part on the rear end side from which the rear cap 3 is removed. Note that FIG. 2 illustrates the state in which the front cap 1 has already been attached to the cylindrical casing 2 but the core body 11 has not been mounted on the writing pressure detecting part 12.

In this case, the flexible cable 17 has one end connected to the connector part 14a of the first circuit part 14 and has the other end protruding from the cylindrical casing 2 as illustrated in FIG. 2. By connecting the other end to the connector part 16a of the second circuit part 16, the first circuit part 14 and the second circuit part 16 can electrically be connected easily. Note that, as illustrated in FIG. 2, the rear end side of the connector part 16a of the second circuit part 16 is a housing space 16b for the flexible cable 17.

Figure 3:
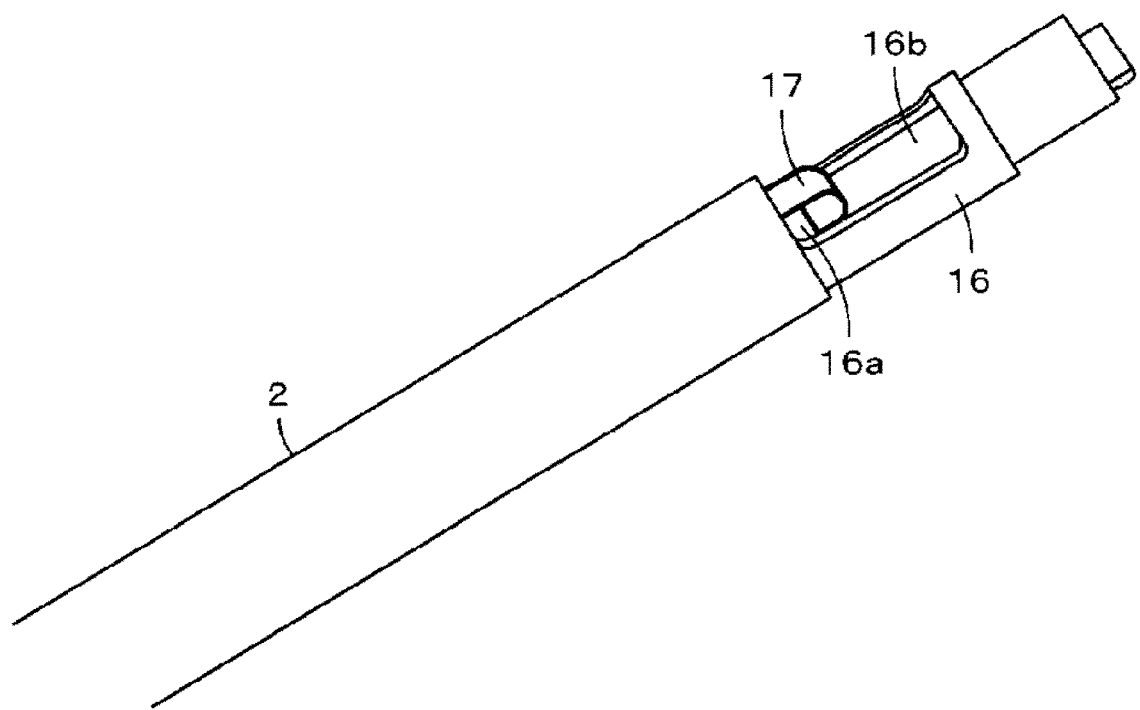
FIG. 3 is a diagram for explaining a state after the second circuit part is connected to the first circuit part housed in the cylindrical casing.

FIG. 3 is a diagram for explaining a state after the second circuit part 16 is connected to the first circuit part 14 housed in the cylindrical casing 2. As illustrated in FIG. 3, the end part of the flexible cable 17 is brought closer to the connector part 16a of the second circuit part 16 while the second circuit part 16 is pushed into the cylindrical casing 2 from the opening part on the rear end side of the cylindrical casing 2. When the end part of the flexible cable 17 has come sufficiently close to the connector part 16a, the flexible cable 17 is folded back, and the end part is inserted into the connector part 16a. As a result, the first circuit part 14 and the second circuit part 16 are electrically connected.

Thereafter, by pushing the second circuit part 16 into the cylindrical casing 2, the second circuit part 16 can be housed at a predetermined position in the cylindrical casing 2. In this case, the flexible cable 17 is folded back in the housing space 16b of the second circuit part 16, and portions of the flexible cable 17 that are facing each other thus become long. As a result, without imposing a burden on the flexible cable 17, the whole of the flexible cable 17 can be housed in the cylindrical casing 2 together with the first circuit part 14, the battery 15, and the second circuit part 16. Thereafter, the rear cap 3 is mounted on the cylindrical casing 2. This can configure the electronic pen of the embodiment having the appearance illustrated in FIG. 1A.

Figure 4A:
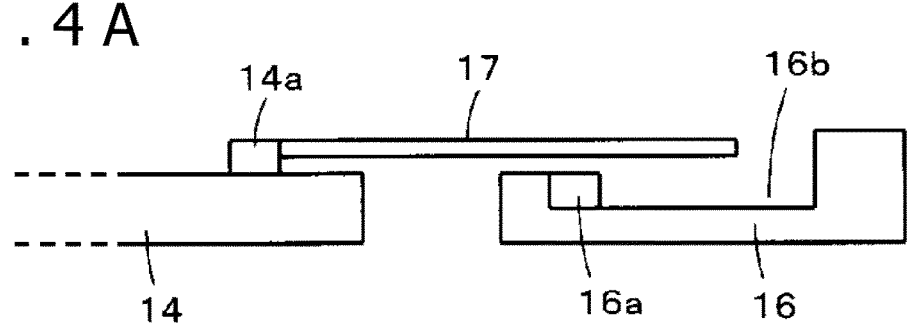
FIG. 4A to FIG. 4C are diagrams for explaining the state of change in a cable that connects the first circuit part and the second circuit part in the electronic pen of the embodiment.
Figure 4B:
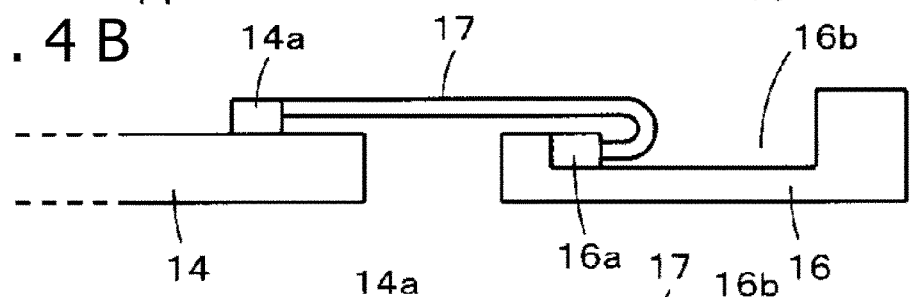
Figure 4C:
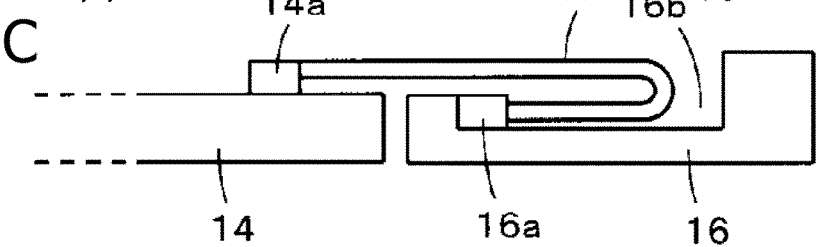

FIG. 4A to FIG. 4C are diagrams for explaining the state of change in the cable that connects the first circuit part 14 and the second circuit part 16 in the electronic pen of the embodiment. In FIG. 4A to FIG. 4C, for simplification of explanation, an example of the case is illustrated in which the connector part 14a of the first circuit part 14 and the connector part 16a of the second circuit part 16 are disposed on surfaces parallel to each other. Further, an example of the case is illustrated in which the insertion ports of the connector parts 14a and 16a are both oriented toward the rear end side of the electronic pen.

As illustrated in FIG. 4A, the flexible cable 17 connected to the connector part 14a of the first circuit part 14 is extended toward the connector part 16a of the second circuit part 16. When the end part of the flexible cable 17 reaches the connector part 16a of the second circuit part 16, the flexible cable 17 is folded back and is connected to the connector part 16a as illustrated in FIG. 4B. Accordingly, the first circuit part 14 and the second circuit part 16 are electrically connected. Further, when the flexible cable 17 is folded back, portions that are folded into a U-shape and face each other are formed in the flexible cable 17. These facing portions are located in the housing space 16b of the second circuit part 16.

When the second circuit part 16 is brought close to the first circuit part 14 by pushing the second circuit part 16 into the cylindrical casing 2 from the state illustrated in FIG. 4B, a portion of the flexible cable 17 that extends from the connector part 14a of the first circuit part 14 is housed while being bent in the housing space 16b. That is, even when the flexible cable 17 is bent and the portions thereof that faces each other become long, the facing portions are housed in the housing space 16b. Therefore, the distance between the first circuit part 14 and the second circuit part 16 can be shortened without applying stress to the flexible cable 17.

In this case, although the folded-back portion with the U-shape exists over the second circuit part 16, the flexible cable 17 does not need to be folded many times between the first circuit part 14 and the second circuit part 16. Thus, a space in which the cable is folded and housed does not need to be set, and therefore, the total length of the electronic pen can be prevented from becoming long. Also, the flexible cable 17 or the connector part 14a or 16a can be prevented from being broken due to application of an unnecessary load to the flexible cable 17 or the connector part 14a or 16a. Further, an inconvenience that the flexible cable 17 comes off from the connector part 14a or 16a can also be prevented.

Effects of Embodiment

According to the electronic pen of the embodiment, the first circuit part 14 and the second circuit part 16 that are housed in the cylindrical casing 2 can electrically be connected easily. Further, even when the first circuit part 14 and the second circuit part 16 that are housed in the cylindrical casing 2 are electrically connected, the length of the electronic pen itself is not increased, and stress is not applied to the cable in order to couple the two circuit parts. Therefore, faults such as contact failure and disconnection are not caused. That is, it is possible to provide an electronic pen that does not cause a problem even when the first circuit part 14 and the second circuit part 16 are connected by the cable.

Modification Examples

In the above-described embodiment, the flexible cable 17 is used. However, the configuration is not limited thereto, and various cables formed into a flat plate shape through laying plural electrical lines side by side can be used.

Note that, in the above-described embodiment, the connector part 16a of the second circuit part 16 is disposed at a position obtained by rotation by 90 degrees with respect to the connector part 14a of the first circuit part 14. However, the configuration is not limited thereto. For example, the connector part 16a can be disposed at a position obtained by rotation by a predetermined angle such as 60 degrees, 120 degrees, or 180 degrees.

Further, in the above-described embodiment, explanation has been made on the basis of the premise that the flexible cable 17 connected to the connector part 14a of the first circuit part 14 is connected to the connector part 16a of the second circuit part 16. However, the configuration is not limited thereto. Depending on the configuration of the electronic pen, the flexible cable 17 connected to the connector part 16a of the second circuit part 16 housed in a casing first can be connected to the connector part 14a of the first circuit part 14 housed in the casing later. That is, the first circuit part is located on the pen tip side in some cases and is located on the opposite side to the pen tip side in other cases. Similarly, the second circuit part is located on the pen tip side in some case and is located on the opposite side to the pen tip side in other cases.

In addition, in the above-described embodiment, explanation has been made on the basis of the premise that the second circuit part 16 implements the short-range wireless communication function of the Bluetooth (registered trademark) standard. However, the configuration is not limited thereto. The short-range wireless communication function of other various standards can be implemented.

Further, in the above-described embodiment, explanation has been made on the basis of the premise that the second circuit part 16 implements the short-range wireless communication function. However, the configuration is not limited thereto. For example, a high-performance control IC, a memory part with high capacity, or the like can be mounted as the second circuit part. That is, a circuit part for implementing various functions can be mounted in the electronic pen as the second circuit part.

Moreover, regarding the shapes of the connectors, connector parts of protruded parts may be disposed at both ends of the flexible cable 17, and connector parts of recessed parts may be employed as the connector parts disposed in the first circuit part 14 and the second circuit part 16. Conversely, connector parts of recessed parts may be disposed at both ends of the flexible cable 17, and connector parts of protruded parts may be employed as the connector parts disposed in the first circuit part 14 and the second circuit part 16.

It should be understood by those skilled in the art that various modifications, combinations, sub-combinations, and alterations may occur depending on design requirements and other factors insofar as they are within the scope of the appended claims or the equivalents thereof.

What is claimed is:

1. An electronic pen comprising:
    a cylindrical casing;
    a first circuit assembly housed in the cylindrical casing;
    a second circuit assembly housed in the cylindrical casing; and
    a cable connected to the first circuit assembly and extending from the first circuit assembly toward the second circuit assembly, the cable including a portion that is bent and folded back toward the first circuit assembly over the second circuit assembly and connected to the second circuit assembly,
    wherein the portion of the cable that is bent and folded is housed in a housing space between the second circuit assembly and the casing when the first circuit assembly and the second circuit assembly are housed at a fixed position in the cylindrical casing,
    wherein the first circuit assembly includes a first connector having a first insertion port,
    wherein the second circuit assembly includes a second connector having a second insertion port, and
    wherein the first insertion port of the first connector is oriented in a same direction as the second insertion port of the second connector.

2. The electronic pen according to claim 1, wherein:
    the second connector of the second circuit assembly is disposed on a side surface of the second circuit assembly along an axial center direction of the electronic pen at a position obtained by rotation of the electronic pen by a predetermined angle with respect to a position at which the first connector of the first circuit assembly is disposed, and
    the cable extends toward the second connector of the second circuit assembly and is folded twice in different directions between the first circuit assembly and the second circuit assembly.

3. The electronic pen according to claim 1, wherein:
    the cable includes a flexible cable.

4. The electronic pen according to claim 1, wherein:
    the first circuit assembly includes:
        a core body,
        a transmitter which, in operation, transmits a signal from the core body to indicate a position of the electronic pen, and
        a power supply, and
    the second circuit assembly includes a circuit which, in operation, receives power from the power supply included in the first circuit assembly.

5. The electronic pen according to claim 1, wherein:
    the second circuit assembly includes an external connector, and
    the first circuit assembly includes a battery which, in operation, is charged through the cable and the external connector.

6. The electronic pen according to claim 1, wherein:
    the second circuit assembly includes a communication circuit which, in operation, performs wireless communication.

* * * * *